United States Patent
Morimoto

(10) Patent No.: US 9,560,177 B2
(45) Date of Patent: *Jan. 31, 2017

(54) NETWORK SYSTEM AND NETWORK FLOW TRACING METHOD

(71) Applicant: NEC Corporation, Tokyo (JP)

(72) Inventor: Masaharu Morimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/072,558

(22) Filed: Mar. 17, 2016

(65) Prior Publication Data

US 2016/0198025 A1    Jul. 7, 2016

Related U.S. Application Data

(63) Continuation of application No. 13/983,001, filed as application No. PCT/JP2011/078439 on Dec. 8, 2011, now Pat. No. 9,313,128.

(30) Foreign Application Priority Data

Feb. 17, 2011 (JP) ................. 2011-031752

(51) Int. Cl.
*H04L 29/06* (2006.01)
*H04L 12/46* (2006.01)
(Continued)

(52) U.S. Cl.
CPC ............ *H04L 69/22* (2013.01); *H04L 12/413* (2013.01); *H04L 12/4633* (2013.01);
(Continued)

(58) Field of Classification Search
CPC ............ H04L 12/4633; H04L 49/3009; H04L 12/413; H04L 45/745; H04L 43/026; H04L 69/22

See application file for complete search history.

(56) References Cited

U.S. PATENT DOCUMENTS 6,907,036 B1    6/2005  Malalur
7,817,549 B1   10/2010  Kasralikar et al.
(Continued)

FOREIGN PATENT DOCUMENTS

CN    1937574 A    3/2007
CN    101155143 A    4/2008
(Continued)

OTHER PUBLICATIONS

U.S. Notice of Allowance dated Dec. 2, 2015 in co-pending U.S. Appl. No. 13/983,001.
(Continued)

*Primary Examiner* — Gbemileke J Onamuti
(74) *Attorney, Agent, or Firm* — McGinn IP Law Group, PLLC.

(57) ABSTRACT

A switch apparatus includes a storage storing a table, the table including rules and actions corresponding to the rules, and a controller including a memory storing instructions, and a processor configured to execute the instructions to receive the rules and the actions from a control apparatus, identify, based on the rules, a received packet, duplicate a part of a header of the identified packet as an additional header when the identified packet includes a target of encapsulation, encapsulate the identified packet by the additional header, and process, based on the actions, the identified packet.

20 Claims, 4 Drawing Sheets

(51) Int. Cl.
  *H04L 12/935* (2013.01)
  *H04L 12/741* (2013.01)
  *H04L 12/413* (2006.01)
  *H04L 12/26* (2006.01)

(52) U.S. Cl.
  CPC .......... *H04L 43/026* (2013.01); *H04L 45/745* (2013.01); *H04L 49/3009* (2013.01)

(56) References Cited

U.S. PATENT DOCUMENTS

| | | | |
|---|---|---|---|
| 8,705,527 | B1 | 4/2014 | Addepalli et al. |
| 2004/0246991 | A1 | 12/2004 | Tsuzuki et al. |
| 2005/0163102 | A1 | 7/2005 | Higashitaniguchi et al. |
| 2005/0208947 | A1 | 9/2005 | Bahl |
| 2006/0227807 | A1 | 10/2006 | Jakubik et al. |
| 2008/0071927 | A1 | 3/2008 | Lee |
| 2009/0138610 | A1* | 5/2009 | Gobara ............... H04L 12/4604 709/228 |
| 2010/0161795 | A1 | 6/2010 | Deridder et al. |
| 2010/0189103 | A1 | 7/2010 | Bachmann et al. |
| 2011/0289230 | A1 | 11/2011 | Ueno |
| 2012/0014386 | A1 | 1/2012 | Xiong et al. |

FOREIGN PATENT DOCUMENTS

| | | |
|---|---|---|
| CN | 101637000 A | 1/2010 |
| CN | 101779421 A | 7/2010 |
| JP | 2005-210518 A | 8/2005 |
| JP | 2006-246125 A | 9/2006 |
| JP | 2008-079304 A | 4/2008 |
| JP | 2009-194713 A | 8/2009 |
| JP | 2010-199669 A | 9/2010 |
| WO | WO 2004/066563 A1 | 8/2004 |
| WO | WO 2010/090182 A1 | 8/2010 |
| WO | WO 2010/103909 A1 | 9/2010 |

OTHER PUBLICATIONS

US Office Action dated Aug. 18, 2015 in co-pending U.S. Appl. No. 13/983,001.
US Office Action dated Jan. 15, 2015 in co-pending U.S. Appl. No. 13/983,001
English Translation of PCT/ISA/237 (written opinion of the international searching authority, dated Jan. 17, 2012).
PCT/IB/373 dated Aug. 21, 2013.
Chinese Office Action dated Jun. 3, 2015 with an English translation thereof.
Japanese Office Action dated Feb. 23, 2015 with a partial English Translation.
International Search Report (ISR) (PCT Form PCT/ISA/210), in PCT/JP2011/004601, dated Jan. 17, 2012.
"OpenFlow Switch Specification, Version1.0.0", [online] Dec. 31, 2009, the Internet (URL: http://www.openflowswitch.org/documents/openflow-spec-v1.0.0.pdf).
Yokoyama, et al. "Proposal of the mechanism to identify the End-to-End flow over NAT gateways." IPSJ SIG Notes, vol. 2001, No. 59, Jun. 8, 2001, pp. 95-100.
Wang, et al. "Tracking Anonymous Peer-to-Peer VoIP Calls on the Internet", Proceedings of the 12th ACM Conference on Computer and Communications Security, Nov. 7, 2005, p. 81-91, XP001241622.
Lee, et al. "ICMP Traceback with Cumulative Path, An Efficient Solution for IP Traceback", In: "Correct System Design", Jan. 1, 2003, Springer International Publishing, Cham 032548, XP055268616, vol. 2836, p. 124-135.

* cited by examiner

NETWORK SYSTEM AND NETWORK FLOW TRACING METHOD

The present application is a Continuation Application of U.S. patent application Ser. No. 13/983,001, filed on Jul. 31, 2013, which is based on International Application No. PCT/JP2011/078439, filed on Dec. 8, 2011, which is based on Japanese Patent Application No. 2011-031752, filed on Feb. 17, 2011, the entire contents of which are incorporated herein by reference.

TECHNICAL FIELD

The present invention relates to a network system, and especially to a network flow tracing method in a network system.

BACKGROUND ART

As one of control systems of a network system, a CU (C: control plane/U: user plane) separation type network system is proposed in which a node unit (user plane) is controlled from an external control unit (control plane).

As an example of the CU separation type network system, an open flow network system is exemplified which uses an open flow (OpenFlow) technique for controlling switches from a controller for route control of the network. The details of the open flow technique have been described in Non-Patent Literature 1. It should be noted that the opening flow network system is only an example.
(Explanation of Open Flow Network System)

In the open flow network system, the controller such as an OFC (OpenFlow Controller) controls the conducts of switches such as OFSs (OpenFlow Switches) by operating flow tables of the switches. The controller and the switches are connected with secure channels.

The switches in the open flow network system form an open flow network, and are edge switches and core switches which are under the control of the controller. A series of processing from the reception of packets (packets) in the edge switch on the input side to the transmission of the packets to the edge switch on the output side in the open flow network is called a flow.

A packet may be referred to as a frame. A difference between the packet and the frame is only a difference in the unit of the data manipulated in the protocol (PDU: Protocol Data Unit). The packet is the PDU of "TCP/IP" (Transmission Control Protocol/Internet Protocol). On the other hand, the frame is the PDU of "the Ethernet (the registered trademark)".

A flow table is a table which stores a flow entry defining a predetermined operation (action) to be carried out to the packets (communication data) which match a predetermined match condition (rule).

The rule of the flow entry is defined based on various combinations of all or some of a destination address, a source address, a destination port, and a source port, which are contained in a header field of each protocol hierarchy of the packet, and is identifiable. Also, the above address contains a MAC address (Media Access Control Address) and an IP address (Internet Protocol Address). Also, in addition to the above, the data of an entrance port (Ingress Port) can be used for the rule of the flow entry. Also, a normal expression, an expression with wildcard "*" and so on of a part (or all) of a value of the header field of the packet showing a flow can be used as the rule of the flow entry.

The action of the flow entry is any of operations such as operations of "outputting to a specific port", "discarding", and "rewriting a header". For example, the switch outputs a packet to a corresponding port if data for identifying the output port (output port number and so on) is shown in the action of the flow entry, and discards the packet if data for identifying the output port is not shown. Or, the switch rewrites the header of the packet based on header data if the header data is shown in the action of the flow entry.

The switch in the open flow network system executes the action of the flow entry to a packet group (a series of packets) which matches the rule of the flow entry.

In the flow-based network like the open flow network system, a group of packets (a series of packets) which match the rule (predetermined header condition) of the flow entry is handled as a flow. By carrying out the monitoring and control of the traffic in a flow unit, the network can be controlled more flexibly than in a conventional network.

For example, when traffic between the server and the client should be controlled for every user, it becomes possible to monitor the flow based on a combination of the IP addresses of the server and of the client in the end-to-end and to control a traffic quantity.

It should be noted that the current network has a very complicated configuration, and equipments having various functions such as a firewall and a load balancer (load distribution apparatus) are often arranged in the front-stage of the server and the client machine. An advantage in the control of the flow-based network control is sometimes lost because of these equipments.

The equipments having a function of NAT (Network Address Translation) and NAPT (Network Address Port Translation) translate a packet header. For example, the equipment having the function of the NAT rewrites an IP header, and the equipment having the function of NAPT rewrites an IP header and a layer 4 header.

Because the packet header has been translated when passing through such an equipment (hereinafter, to be referred to as a header translating unit), the flow after the passage is different from the flow before the passage. Therefore, when relayed by such a header translating unit, the monitoring and control for every flow in end-to-end cannot be carried out.

As the technique to solve such a problem, for example, a method of using header translation data retained by the header translating unit is known. Specifically, a method is thought of in which a unit outputs an inquiry to the header translating unit to refer to an address translation table, and acquires the data of the packet header before the translation from the data of the packet header after the translation to find a corresponding flow.

However, this method can be realized if the header translating unit has an interface which can be inquired from an external unit and moreover the data of the address translation table can be referred to. If such conditions are not met, the header translating unit must be changed and the conditions must be fit.

Also, as another method, Patent Literature 1 (JP 2005-210518A) discloses a transmission source tracing data providing apparatus and a transmission source tracing apparatus as an apparatus which carries out IP trace-back.

As a representative example of the IP trace-back technique, there is ICMP trace-back (Internet Control Message Protocol Traceback) proposed by the ICMP traceback working group of IETF (Internet Engineering Task Force). In the ICMP trace-back, a router unit on a route selects an IP packet of a trace target in a predetermined probability, generates trace data to this IP packet, and transmits the trace data to the destination of the IP packet by use of an ICMP message, and then the destination unit displays the trace data.

There is a possibility that the correspondence relation of the separated flow by applying a similar technique to the above can be acquired.

However, in order to realize such a technique, the header translating unit needs a mechanism to transmit address translation data to the outside. Therefore, it is difficult to realize this without remodeling the header translating unit.

CITATION LIST

[Patent Literature 1] JP 2005-210518A
[Non-Patent Literature 1] "OpenFlow Switch Specification, Version 1.0.0", [online] Dec. 31, 2009, the Internet (URL: http://www.openflowswitch.org/documents/openflow-spec-v1.0.0.pdf)

SUMMARY OF THE INVENTION

An object of the present invention is to provide a network system and a network flow tracing method in which a packet is encapsulated by using the same header as a current header in a switch, and has two kinds of headers before translation and after the translation after passing through a network appliance. It should be noted that the headers contain all the headers from layer 2 to layer 4. Specifically, the above-mentioned header is read as "all or a part of data for a rule of a flow entry".

The network system according to the present invention is provided with a switch having a function to process a reception packet based on a set entry of a flow table; a controller having a function to receive an inquiry of the packet from the switch, and to set the entry defining a rule and an operation to uniformly control packets to the flow table of the switch; and an encapsulating module having a function to receive the packet from at least one of the switch and the controller and to encapsulate the packet by using a same header as a header of the packet.

The computer according to the present invention having a function as an encapsulating module, comprising: a unit for receiving a packet from at least one of a switch which has a function to process a reception packet based on a set entry of a flow table, and a controller which has a function to receive an inquiry of the packet from the switch, and to set the entry defining a rule and an operation to uniformly control packets to the flow table of the switch; and a unit for encapsulating the packet by using a same header as a header of the packet.

In the network flow tracing method according to the present invention, a reception packet is processed based on a set entry of a flow table in a switch. Also, an inquiry of the packet from the switch is received, and the entry defining a rule and an operation to uniformly control packets is set to the flow table of the switch, in a controller. Also, the packet from at least one of the switch and the controller is received and the packet is encapsulated by using a same header as a header of the packet, in an encapsulating module.

The program according to the present invention makes a computer which has a function as an encapsulating module, execute: a step of receiving a packet from at least one of a switch which has a function to process a reception packet based on a set entry of a flow table, and a controller which has a function to receive an inquiry of the packet from the switch, and to set the entry defining a rule and an operation to uniformly control packets to the flow table of the switch; and a step of encapsulating the packet by using a same header as a header of the packet. That is, the program according to the present invention is a program to make a computer execute processing in the above-mentioned network flow tracing method. It should be noted that the program according to present invention can be stored in a storage unit or a storage medium.

In the flow-based network like the open flow network system, even when passed through network appliance such as NAT and NAPT for translating the packet header, a corresponding relation between two flows before and after the passage can be grasped, and the tracing of the flow in end-to-end becomes possible.

DESCRIPTION OF EXEMPLARY EMBODIMENTS

The present invention deals with a CU separation type network system. In this case, an open flow network system as one of the CU separation type network systems will be described, using it as an example. However, actually, the present invention is not limited to the open flow network system.

[Exemplary Embodiments]

Hereinafter, exemplary embodiments of the present invention will be described with reference to the attached drawings.

(Basic Structure)

Figure 1:
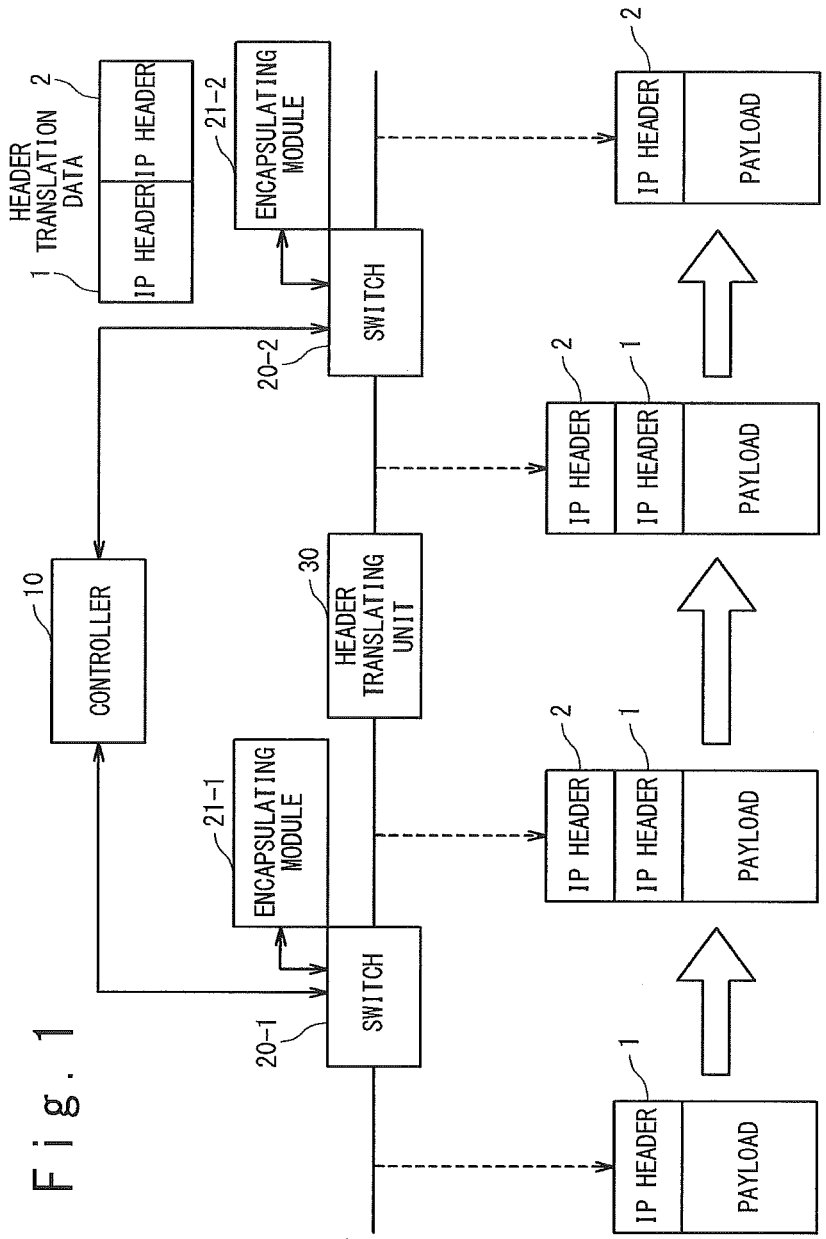
FIG. 1 is a diagram showing a basic configuration example of a network system according to the present invention and change of a packet in the system.

As shown in FIG. 1, the network system according to the present invention includes a controller 10, switches 20 (20-i, i=1 to n: n is the number of switches), and a header translating unit 30.

(Controller)

When detecting the switch 20 (20-i, i=1 to n), the controller 10 calculates a packet transfer route based on topology data showing a connection state of the switches in the network, and registers an entry (flow entry) on a flow table of each of the switches related to the calculated route.

(Switch)

Each of the switches 20 (20-i, i=1 to n) transfers a received packet according to an entry registered on its own flow table. In this case, it is supposed that each of the switches 20 (20-i, i=1 to n) is a virtual switch. The virtual switch is a switch realized by a virtual machine which operates on a physical machine. However, actually, each of the switches 20 (20-i, i=1 to n) may be a physical switch in which software to realize a function as the switch according to the present invention is installed.

Also, the switch 20 (20-i, i=1 to n) cooperates with an encapsulating module 21 (21-i, i=1 to n). The encapsulating module 21 (21-i, i=1 to n) carries out encapsulation of an IP packet.

It should be noted that the encapsulating module 21 (21-i, i=1 to n) may be built in the physical machine in which the switch 20 (20-i, i=1 to n) operates and may be connected with the physical machine. For example, the encapsulating module 21 (21-i, i=1 to n) may operate on a computer which can communicate with the physical machine.

(Header Translating Unit)

The header translating unit 30 translates the header data of a packet received from a predetermined switch 20 and transfers to another switch 20.

(Exemplification of Hardware)

An example of the specific hardware to realize the network system according to the present invention will be described below.

As an example of the controller 10, computers such as a PC (personal computer), appliance, a thin client terminal/server, a workstation, a mainframe, and a supercomputer are assumed. Also, the controller 10 may be an extension board which is installed in the computer and a virtual machine (VM) built on a physical machine.

As an example of a physical machine on which the switch 20 (20-i, i=1 to n) operates as a virtual switch and the header translating unit 30, a network switch, a router, a proxy, a gateway, a firewall, a load balancer, a base station, an access point, a computer which has a plurality of communication ports and so on are exemplified.

Each of the controller 10 and the physical machine on which the switch 20 (20-i, i=1 to n) operates, and the header translating unit 30 is realized by a processor which executes predetermined processing based on a program, a memory which stores the program and all kinds of data, and a communication interface to connect with network.

As an example of the above-mentioned processor, a CPU (Central Processing Unit), a network processor (NP), a microprocessor, a microcontroller and a semiconductor integrated circuit (LSI) and so on which has a function of an exclusive use are exemplified.

As an example of the above-mentioned memory, a semiconductor memory device such as RAM (Random Access Memory), ROM (Read Only Memory), EEPROM (Electrically Erasable and Programmable Read Only Memory) and a flash memory, an auxiliary storage such as HDD (Hard Disk Drive) and SSD (Solid State Drive), a removable disk such as DVD (Digital Versatile Disk), a storage medium such as an SD memory card (Secure Digital memory card) and so on are exemplified.

It should be noted that the above-mentioned processor and the above-mentioned memory may be unified. For example, in recent years, a 1-chip microcomputer is being developed. Therefore, a case that the 1-chip microcomputer installed in the computer and so on is composed of a processor and a memory is thought of.

As an example of the above-mentioned communication interface, a substrate (motherboard, and an I/O board) corresponding to the network communication, a semiconductor integrated circuit of a chip and so on, a network adapter such as NIC (Network Interface Card), a similar expansion card, a communication device such as an antenna, a communication port such as a connection mouth (connector) and so on are exemplified.

Also, as an example of the network, the Internet, LAN (Local Area Network), wireless LAN (Wireless LAN), WAN (Wide Area Network), backbone, CATV line, fixation telephone network, mobile phone network, WiMAX (IEEE 802.16a), 3G (3rd Generation), dedicated line (leased line), IrDA (Infrared Data Association), Bluetooth (registered trademark), serial communication line, data bus and so on are exemplified.

As an example of the encapsulating module 21 (21-i, i=1 to n), software or virtual machine which operates on the same physical machine as the switch 20 (20-i, i=1 to n) are assumed. However, actually, the encapsulating module 21 (21-i, i=1 to n) may be the software or the virtual machine which operates on an external server to which each of the switches 20 (20-i, i=1 to n) can access. Also, the encapsulating module 21 (21-i, i=1 to n) may be an exclusive use device, an expansion board or a peripheral device which is installed in the physical machine, an intermediate equipment (middle box) on the network in addition to the software.

However, actually, the present invention is not limited to these examples.

(Operation of Controller)

The controller 10 previously sets "the encapsulation of a packet in a predetermined flow" to the encapsulating module 21-1 of the switch 20-1. Specifically, the controller 10 previously sets "duplicating the IP header of the packet in a predetermined flow, encapsulating a packet with the same header as the IP header, and transferring the encapsulated packet" to the encapsulating module 21-1 of the switch 20-1. In this case, an example of using the IP header is described, but the IP header is only an example of the header. Actually, all the headers from layer 2 to layer 4 may be dealt with without limiting to the IP header of layer 3. Specifically, "the IP header" may be read as "a part or all of data which can function as a rule of the flow entry".

Also, the controller 10 previously sets "transmitting a pair of a header before translation and a header after the translation as header translation data to the controller and cancelling capsulation of a received packet by removing the header after the translation if there is the header after the translation, and replacing the header before the translation with the header after the translation if there is the header before the translation" to the encapsulating module 21-2 of the switch 20-2. It should be noted that "removing all the headers from the reception packet once and then giving only the header after the translation" may be set. Also, "removing the second stage header (the header before the translation) in the reception packet if there is it" may be set.

(Operation of First Switch)

Next, the switch 20-1 hands an inputted packet to the encapsulating module 21-1. Here, the inputted packet has the structure of "the IP header 1-the payload".

The encapsulating module 21-1 duplicates the IP header 1 of the packet as set from the controller 10, encapsulates the packet with the same header as the IP header 1 and transfers the packet. That is, the IP header 1 is given to the payload doubly (two stages) in the transferred packet. Therefore, the packet transferred from the switch 20-1 has the structure of "the IP header 1-the IP header 1-the payload".

In this case, "the IP header 1" at the head of "the IP header 1-the IP header 1-the payload" is the IP header of the encapsulated packet, and the remaining part of "the IP header 1-the payload" (original packet) is a payload of the encapsulated packet.

It should be noted that as for the encapsulation of the packet, for example, a method such as GRE (Generic Routing Encapsulation) shown in RFC1701 and RFC2784 may be used.

(Operation of Header Translating Unit)

Next, the header translating unit 30 refers to the IP header 1 of the inputted packet, carries out the address translation processing to translate the IP header 1 into the IP header 2.

For example, when the destination IP address is a private address of "192.168.0.10", the header translating unit 30 translates the IP header 1 of the inputted packet into the IP header 2 having the global address of "10.0.0.10" as the destination IP address.

In this way, the header translating unit 30 translates the IP header 1 of the inputted packet into the IP header 2 having a different value and transfers the packet. In this case, the header translating unit 30 removes or translates a head part of the IP header 1 given doubly, and then transfers the packet after after giving the IP header 2 to the payload. Therefore, the transferred packet has the structure of "the IP header 2-the IP header 1-the payload". That is, when receiving the encapsulated packet from the switch 20-1, the header translating unit 30 translates "the IP header 1" of "the IP header 1-the IP header 1-the payload" at the head of of the IP header of the encapsulated packet into "the IP header 2". In this case, "the IP header 2" at the head of "the IP header 2-the IP header 1-the payload" is set as the IP header of the transferred packet, and the remaining part (original packet) of "the IP header 1-the payload" is set as the payload of the transferred packet.

(Operation of Second Switch)

Next, the switch 20-2 hands an inputted packet to the encapsulating module 21-2.

"Transmitting a pair of the header after the translation and the header before translation as header translation data to the controller, carrying out processing of removing the header after the translation if it is present, and replacing the header before the translation with the header after the translation if it is preset" is set to the encapsulating module 21-2 from the controller 10. Or, "giving only the header after the translation after removing all the headers from the reception packet once" may be set. Or, "if there is a second-stage header (the header before the translation) in the reception packet, removing it" may be set.

In this case, the encapsulating module 21-2 checks whether or not the inputted packet is an encapsulated packet. If being the encapsulated packet, the encapsulating module 21-2 refers to the IP header 2 and the IP header 1 of "the IP header 2-the IP header 1-the payload", and generates header translation data based on a pair (or set) of them and transmits it to the controller 10.

In the above example, the header translation data indicates that the source IP address of "192.168.0.10" is changed to "10.0.0.10".

Also, the encapsulating module 21-2 removes the IP header 2 at the head of "the IP header 2-the IP header 1-the payload" to decapsulate the inputted encapsulated packet, and replaces "the IP header 1" with "the IP header 2" of the remaining portion of "the IP header 1-the payload" (original packet).

In this way, the encapsulating module 21-2 removes the IP header 1 from the original packet and adds the IP header 2 to the payload, and then transfers the packet. Therefore, the configuration of the transferred packet is of "the IP header 2-the payload".

By operating as mentioned above, the controller 10 can acquire the header translation data without improving the header translating unit 30, and trace the flow by using the data.

(Application Example)

It should be noted that the controller 10 itself may carry out the processing of the switch 20 (20-i, i=1 to n) ("encapsulation" on the transmission side and "decapsulation on the reception side"). In this case, the controller 10 cooperates with the encapsulating module 21 (21-i, i=1 to n). Also, the controller 10 and the encapsulating module (21-i, i=1 to n) may be an identical unit. The switch 20 (20-i, i=1 to n) transmits the whole of inputted packet to the controller 10 and receives the processing result as a response. For example, it is supposed that the controller 10 cooperates with the encapsulating module 21-1 and the encapsulating module 21-2 in FIG. 1, and that they are unified. The switch 20-1 transmits "the reception packet" to the controller 10 and receives "an encapsulated packet" from the controller 10 as the response. Also, the switch 20-2 transmits the "encapsulated packet" to the controller 10 and receives a "packet having only the translated header" from the controller 10 as the response. Therefore, if the necessary processing can be carried out in a necessary place, the location of the encapsulating module 21 (21-i, i=1 to n) may be on the side of the controller 10 or on the side of the switch 20 (20-i, i=1 to n). Of course, the processing may be carried out in both of the switch 20 (20-i, i=1 to n) and the controller 10. For example, usual packets are processed on the switch 20 (20-i, i=1 to n), and packets of an important flow may be processed on the controller 10.

At this time, the encapsulating module 21 (21-i, i=1 to n) may operate on a computer which can communicate with each of the controller 10 and the switches 20 (20-i, i=1 to n).

Also, an example that the IP packet is translated by using NAT has been described here for simplification of description. A case that a MAC frame is translated by using MAT (MAC Address Translation) and a case that a TCP/UDP packet is translated by using NAPT can be carried out in the same way. Not only the IP header of layer 3 but also the headers from layer 2 to layer 4 can be dealt with for the translation. Specifically, "the IP header (or header)" in the above description of the present invention is read as "a part or whole of data for a rule of a flow entry".

(Operation of First Encapsulating Module)

Figure 2:
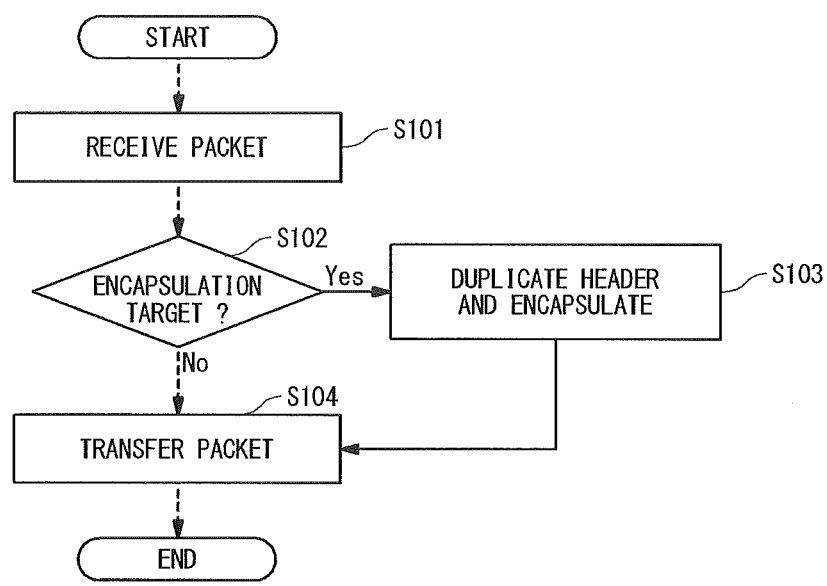
FIG. 2 is a flow chart showing processing of an encapsulating module to a switch in the front of a header translating unit.

Referring to a flow chart of FIG. 2, an operation of the encapsulating module 21-1 will be described.

(1) Step S101

The encapsulating module 21-1 receives a packet. In this case, the configuration of the reception packet is of "the IP header 1-the payload".

(2) Step S102

Next, the encapsulating module 21-1 checks whether or not the reception packet is a packet of an encapsulation target.

(3) Step S103

In case of being the packet of the encapsulation target, the encapsulating module 21-1 refers to the IP header 1, duplicates the IP header 1 and carries out encapsulation by using the same IP header 1. In this case, the configuration of the packet is of "the IP header 1-IP header 1-the payload".

(4) Step S104

The encapsulating module 21-1 transfers the packet through the switch 20-1. In case of being the packet of the encapsulation target, the configuration of the packet is of "the IP header 1-the IP header 1-the payload". In case of not being the packet of the encapsulation target, the configuration of the packet is of "the IP header 1-the payload".

(Operation of Header Translating Unit)

The header translating unit 30 translates the IP header of the transferred packet. In case of being the encapsulated packet, the header translating unit 30 translates the configuration of the packet from "the IP header 1-the IP header 1-the payload" into "the IP header 2-the IP header 1-the payload". In case of not being the encapsulated packet, the header translating unit 30 translates the configuration of the packet from "the IP header 1-the payload" into "the IP header 2-the payload".

Because the processing of the header translating unit 30 is not processing peculiar to the present invention but general header translation processing, the description is omitted.
(Operation of second encapsulating module)

Figure 3:
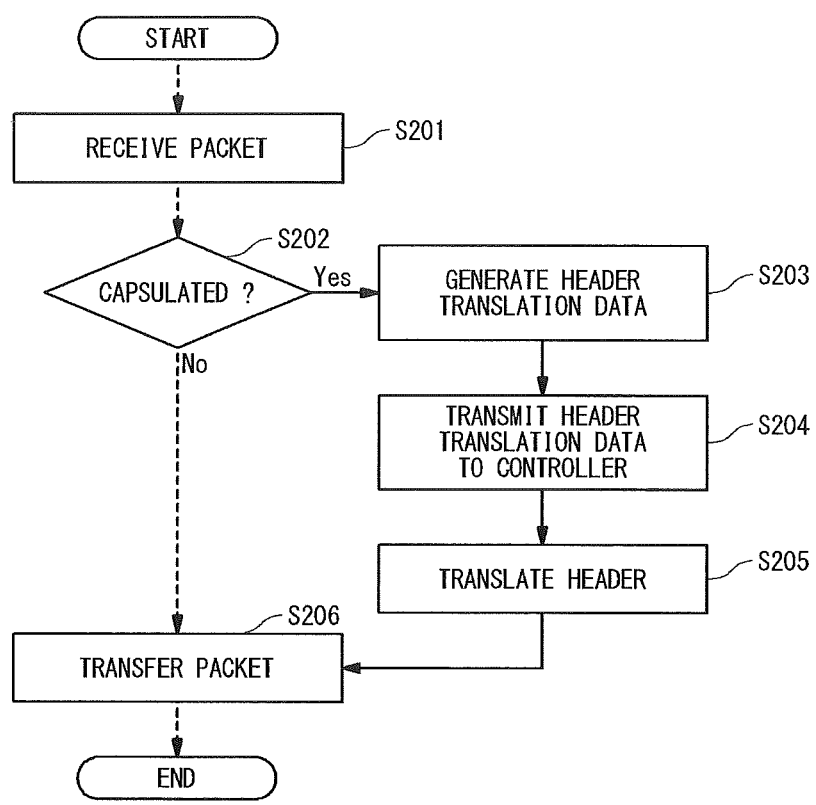
FIG. 3 is a flow chart showing processing of the encapsulating module to the switch in the back of the header translating unit.

Next, referring to a flow chart of FIG. 3, the processing of the encapsulating module 21-2 will be described.
(1) Step S201

The encapsulating module 21-2 receives a packet.
(2) Step S202

Next, the encapsulating module 21-2 checks whether or not the reception packet is an encapsulated packet. In case of being the encapsulated packet, the configuration of the packet is of "the IP header 2-the IP header 1-the payload". In case of not being the encapsulated packet, the configuration of the packet is of "the IP header 2-the payload".
(3) Step S203

In case of being the encapsulated packet, the encapsulating module 21-2 refers to the IP headers 2 and the IP headers 1 and generates header translation data. The header translation data is a pair (set) of "the IP header 1" before the translation and "the IP header 2" after the translation.
(4) Step S204

Next, the encapsulating module 21-2 transmits the generated header translation data to the controller 10.
(5) Step S205

Next, the encapsulating module 21-2 removes "the IP header 2" from the encapsulated packet of "the IP header 2-the IP header 1-the payload" and replaces "the IP header 1" of "the IP header 1-the payload" with "the IP header 2". At this time, the encapsulating module 21-2 retains "the IP header 2", which has been first removed, as the header after the translation, removes "the IP header 1" as the header before the translation from "the IP header 1-the payload", and adds "the IP header 2" as the header after the translation to "the payload". That is, "the IP header 1" as the header before the translation is substituted by "the IP header 2" as the header after the translation. Or, after all the headers of "the IP header 2-the IP header 1" are removed from the encapsulated packet of "the IP header 2-the IP header 1-the payload" once, only the header of "the IP header 2" is added to the payload after the translation. Or, processing is carried out to remove the second header ("the IP header 1" as the header before the translation) from the reception packet. Thus, the configuration of the packet is of "the IP header 2-the payload".
(6) Step S206

The encapsulating module 21-2 transfers the packet through the switch 20-2. The configuration of the packet is of "the IP header 2-the payload".
(Supplement)

It should be noted that it is enough that the controller 10 can acquire the header translation data once. The encapsulation of the packet may be stopped after the acquisition.

As mentioned above, by the encapsulating module 21-1 and the encapsulating module 21-2 carrying out encapsulation of the packet and acquisition of the header translation data, the controller grasps a corresponding relation of the flows before the translation and after the translation, and the trace of the flow can be carried out even when passing through the header translating unit.
<Points of the Present Invention>

In the present invention, a technique is disclosed which identifies flows in the front and back of the header translating unit by using the encapsulating function of the packet which is installed in "OpenV Switch" as one of the switches in the open flow.

Figure 4:
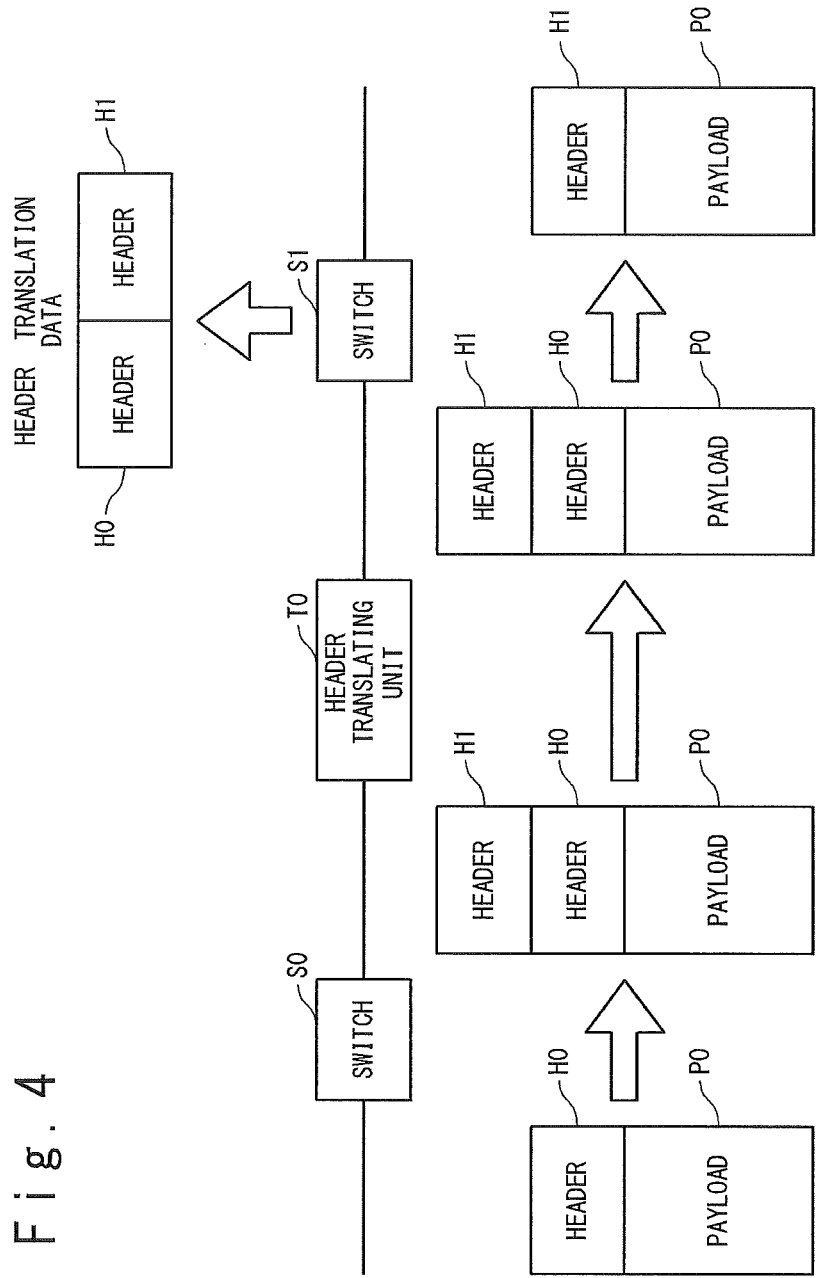
FIG. 4 is a diagram showing the concept of the network system according to the present invention and exemplary embodiments.

In the present invention, the switch in the front of the header translating unit duplicates the same header as the header of a packet and encapsulates the packet, as shown in FIG. 4.

Here, it is supposed that the status that the packet PKT0 has the header H0 and the payload P0 is represented as being "the packet PKT0=(H0, P0)".

When receiving the packet PKT0, the switch S0 refers to the header H0 to duplicate the same header H0, and encapsulates the packet PKT0 to generate the packet PKT1. That is, because the packet PKT1 has the header H0 and the payload (H0, P0), the packet PKT1 is represented as "the packet PKT1=(H0, (H0, P0))".

Supposing that the packet after this packet PKT1 passes through the header translating unit TO is PKT2, the packet PKT2 is represented as "the packet PKT2=(H1, (H0, P0))" because the header of the packet PKT2 is changed from the header H0 into header H1.

Next, when receiving the packet PKT2, the switch S1 compares (compares and refers) the header H1 and the header H0 in the payload. Thus, the switch S1 recognizes that the original header H0 is changed into the header H1 by the header translating unit TO.

The switch S1 decapsulates the packet PKT2, removes the header H1 from the packet PKT2, replaces the header H0 in the payload with the header H1, and forms the packet PKT3. That is, the switch S1 replaces "the packet PKT2=(H1, (H0, P0))" with "the packet PKT3=(H1, P0)".

After that, the switch S1 transmits the packet PKT3.

In this way, the present invention can acquire the corresponding relation of the flows in the front and back of the header translating unit without remodeling the header translating unit TO. Therefore, the trace of the flow becomes possible.

At mentioned above, in the present invention, a packet is encapsulated in the switch (in the controller which receives a request from the switch). In such a case, by encapsulating by using the same header as the current header, two kinds of headers before the translation and after the translation are attached to the packet after the packet has passed through the network appliance. The trace of the flow becomes possible using this.
<Summary>

In the present invention, in the flow-based network like the open flow network system, by encapsulating a packet by using the same header as the current packet header, even when passed through a network appliance such as NAT and NAPT for changing the packet header, the corresponding relation of two flows before and after the passage can be grasped and the trace of the flows in end-to-end becomes possible.

Also, in the present invention, because only the packet header given by the encapsulation is translated and the translation data can be acquired by comparing with the packet header before the translation, the acquisition of the translation data of the packet header and the trace of the flows become possible without remodeling the network appliance by which a packet header is translated.
<Supplemental Notes>

A part or all of the above-mentioned exemplary embodiments can be mentioned like the following supplemental notes. However, actually, the present invention is not limited to the following specified examples.

(Supplemental Note 1)

A network system includes:

a switch having a function of) searching a flow table which stores an entry defining a rule and an operation to uniformly control packets of a flow and carrying out the operation defined in the entry, to the reception packet matching the rule defined in the entry in case of the packet reception;

a controller having a function to receive an inquiry of the packet from the switch, and to set the entry to the flow table of the switch;

a header translating unit having a function to translate header data at a head of the reception packet and to transfer the packet, in case of the packet reception; and an encapsulating module having a function to check whether or not the packet received by the switch is an encapsulated packet; to duplicate header data of the packet in case of not being the encapsulated packet, to give the duplicated header data to the reception packet to encapsulate and to hand to the switch; to remove header data at a head of the encapsulated packet and to replace header data in a remaining part with the removed header data to hand to the switch in case of being the encapsulated packet; and to notify a set of the removed header data and the header data in the remaining part to the controller as header translation data.

(Supplemental Note 2)

The network system according to supplemental note 1, wherein the encapsulating module has a function to duplicate a first header which is the header data of the reception packet of a first switch when the switch is the first switch in a front of the header translating unit, and to give the first header to the reception packet to transfer a packet, which has a configuration called "the first header-the first header-the payload" in which the first header is given doubly to the payload, through the first switch as the encapsulated packet, wherein the header translating unit has a function to translate the first header at a head of the encapsulated packet into a second header when receiving the packet from the first switch, and to generate and transfer a packet which has a configuration called "the second header-the first header-the payload", and wherein the encapsulating module has a function to refer to header data of a reception packet of a second switch to notify a set of the first header and the second header to the controller as the header translation data, when the switch is the second switch in a back of the header translating unit, to remove the second header at a head of the reception packet, to replace the first header in a remaining part with the second header, to generate a packet with a configuration called "the second header-the payload" and to transfer through the second switch.

(Supplemental Note 3)

The network system according to supplemental note 1, wherein the encapsulating module is provided on a side of at least one of the switch and the controller, and has a function to receive the packet directly from the switch when provided on the side of the switch, and to receive the packet from the switch through the controller when provided on the side of the controller.

(Supplemental Note 4)

A computer having a function as an encapsulating module, and includes:

a unit for checking whether or not the reception packet is an encapsulated packet;

a unit for duplicating header data of the packet when the reception packet is not the encapsulated packet;

a unit for giving the duplicated header data to the reception packet for encapsulation;

a unit for removing header data at a head of the encapsulated packet when the reception packet is the encapsulated packet;

a unit for replacing the header data in the remaining part of the encapsulated packet with the removed header data; and a unit for generating header translation data based on a set of the header data in the remaining part and the removed header data.

<Remarks>

As such, the exemplary embodiments of the present invention have been described in detail. However, actually, the present invention is not limited to the above-mentioned exemplary embodiments and a modification which does not deviate from the features of the present invention is contained in the present invention.

It should be noted that the present application claims a priority based on Japan Patent Application No. JP 2011-031752. The disclosure thereof is incorporated herein by reference.

What is claimed is:

1. A switch apparatus, comprising:
a storage storing a table, the table including rules and actions corresponding to the rules; and
a controller comprising:
a memory storing instructions; and
a processor configured to execute the instructions to:
receive the rules and the actions from a control apparatus;
identify, based on the rules, a received packet;
duplicate a part of a header of the identified packet as an additional header when the identified packet comprises a target of encapsulation;
encapsulate the identified packet by the additional header; and process, based on the actions, the identified packet.

2. The switch apparatus according to claim 1, wherein the processor is further configured to execute the instructions to send header information to the control apparatus when the identified packet comprises an encapsulated packet.

3. The switch apparatus according to claim 2, wherein the header information includes the additional header.

4. The switch apparatus according to claim 3, wherein the processor is further configured to execute further instructions to decapsulate the encapsulated packet.

5. The switch apparatus according to claim 1, wherein the processor is further configured to execute the instructions for translation of first header data of a head of the received packet into second header data.

6. The switch apparatus according to claim 5, wherein the instructions to encapsulate the identified packet includes notifying the controller of the first header data before the translation and the second header data after the translation.

7. A communication system, comprising:
a control apparatus configured to control a plurality of switch apparatuses; and
a switch apparatus of the switch apparatuses comprising:
a storage storing a table, the table including rules and actions corresponding to the rules; and
a controller comprising:
a memory storing instructions; and
a processor configured to execute the instructions to:
receive the rules and the actions from a controller;
identify, based on the rules, a received packet;

duplicate a part of a header of the identified packet as an additional header when the identified packet comprises a target of encapsulation;

encapsulate the identified packet by the additional header; and process, based on the actions, the identified packet.

8. The communication system according to claim 7, wherein the processor is further configured to execute the instructions to send header information to the control apparatus when the identified packet comprises an encapsulated packet.

9. The communication system according to claim 8, wherein the header information includes the additional header.

10. The communication system according to claim 9, wherein the processor is further configured to execute further instructions to decapsulate the encapsulated packet.

11. The communication system according to claim 7, wherein the processor is further configured to execute the instructions for translation of the first header data of a head of the received packet into the second header data.

12. The communication system according to claim 11, wherein the instructions to encapsulate the identified packet includes notifying the controller of first header data before the translation and second header data after the translation.

13. A communication method, comprising:

receiving rules and actions from a controller;

identifying, based on the rules, a received packet;

duplicating a part of a header of the identified packet as an additional header when the identified packet comprises a target of encapsulation;

encapsulating the identified packet by the additional header; and processing, based on the actions, the identified packet.

14. The communication method according to claim 13, further comprising:

sending header information to a controller when the identified packet comprises an encapsulated packet.

15. The communication method according to claim 14, wherein the header information includes the additional header.

16. The communication method according to claim 15, further comprising:

executing further instructions to decapsulate the encapsulated packet.

17. The communication method according to claim 14, further comprising:

translating first header data of a head of the received packet into second header data.

18. The communication method according to claim 17, further comprising:

notifying the controller of the first header data before the translating and the second header data after the translating.

19. A non-transitory recording medium recording a program which when executed causes a switch to perform a method, the method comprising:

receiving rules and actions from a controller;

identifying, based on the rules, a received packet;

duplicating a part of a header of the identified packet as an additional header when the identified packet comprises a target of encapsulation;

encapsulating the identified packet by the additional header; and processing, based on the actions, the identified packet.

20. The non-transitory recording medium, according to claim 19, the method further comprising:

sending header information to the controller when the identified packet comprises an encapsulated packet, wherein the header information includes the additional header.

* * * * *